Nov. 9, 1965 I. M. KLIMAN 3,217,317
INFORMATION TRANSFORMATION SYSTEM
Filed Jan. 23, 1962 2 Sheets-Sheet 1

INVENTOR.
IVAN M. KLIMAN
BY
ATTORNEY

Nov. 9, 1965  I. M. KLIMAN  3,217,317
INFORMATION TRANSFORMATION SYSTEM
Filed Jan. 23, 1962  2 Sheets-Sheet 2

INVENTOR.
IVAN M. KLIMAN
BY
ATTORNEY

United States Patent Office 3,217,317
Patented Nov. 9, 1965

3,217,317
INFORMATION TRANSFORMATION SYSTEM
Ivan Merwin Kliman, Glen Head, N.Y., assignor to Sperry Rand Corporation, Great Neck, N.Y., a corporation of Delaware
Filed Jan. 23, 1962, Ser. No. 168,090
2 Claims. (Cl. 340—347)

This invention relates to information transformation means and more particularly to the use of a magnetic core matrix for transferring between two information identification systems for designating or identifying the same information.

The present invention is useful, for example, in position indicating apparatus such as radar systems for changing the designation of a target from coordinates in one coordinate system to corresponding coordinates in a different coordinate system.

It is an object of this invention to provide means for transforming the identification of information from one designation system to another.

It is another object of this invention to provide a relatively simple coordinate transformation system.

A further object is to provide a simplified means for transforming information identification by combining, to an extent, the apparatus and process for storing the information and the selection of the information from storage.

The present invention will be described by referring to the accompanying drawings wherein.

Figure 1:
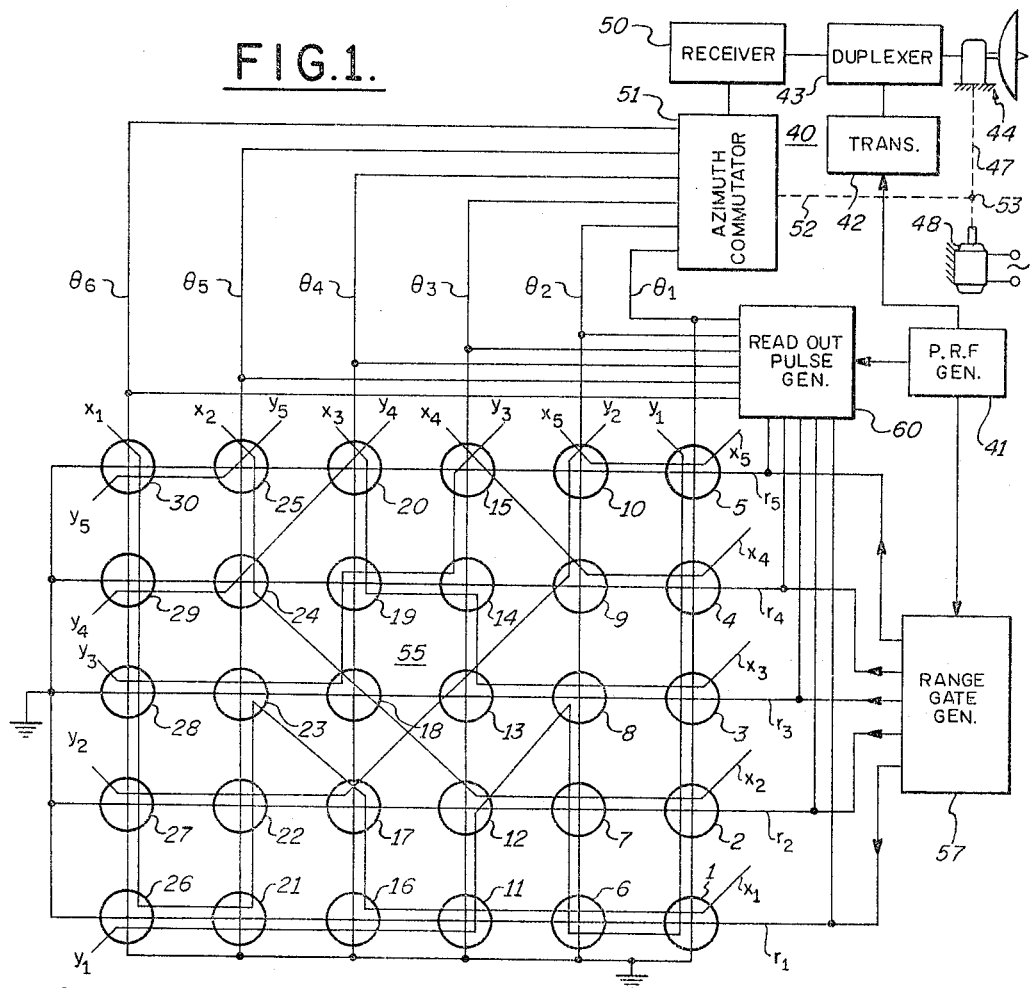
FIG. 1 is a simplified schematic diagram, partially in block form, illustrating the use of the present invention in a radar system for transferring the designation of a detected target from a polar coordinate system to a rectangular coordinate system.

Referring now in detail to the drawings, FIG. 1 illustrates the use of the present invention in a pulsed radar system for transforming the polar coordinate designation of a target to the rectangular coordinate designation and is comprised of a conventional pulsed radar system 40 having a pulse repetition frequency (P.R.F.) generator 41 which produces recurrent output pulses that are coupled to transmitter 42. High power pulses from transmitter 42 are coupled through a conventional duplexer 43 and are radiated into space by a scanning antenna 44. In the example assumed here, antenna 44 is scanned through a 90° sector in azimuth by means of a mechanical linkage 47 driven by motor 48. It further will be assumed that the 90° azimuth sector is subdivided into six smaller sectors $\theta_1$–$\theta_6$ of 15° each. Pulses of energy reflected from remotely located targets are received by antenna 44, are coupled through duplexer 43 to receiver 50 wherein they are detected and coupled to azimuth commutator 51. Azimuth commutator 51 operates in synchronism with scanning antenna 44, by means of a mechanical linkage 52 and gear box 53, to couple received pulses to a selected one of the column selector lines $\theta_1$–$\theta_6$ depending upon the azimuth position of antenna 44. That is, when antenna 44 is scanning azimuth sector $\theta_1$, receiver 50 will be coupled to column selector line $\theta_1$; when antenna 44 is scanning azimuth sector $\theta_2$, receiver 50 is coupled through azimuth commutator 51 to column selector line $\theta_2$, and so on. The set of column selector lines $\theta_1$–$\theta_6$ thread respective columns of annular magnetic cores in magnetic core matrix 55. The cores of said matrix may be of a ferrite material well known to those skilled in the art and are characterized by having a substantially rectangular hysteresis loop and two remanent states of magnetization. The magnitude of the pulses coupled to the $\theta_1$–$\theta_6$ column selector lines has one-half the magnitude required to transfer one of the magnetic cores from the first one of its remanent magnetization states to the second of its remanent magnetization states.

Each of the rows of magnetic cores in matrix 55 is threaded by a respective line of a set of row selector lines $r_1$–$r_5$ which is coupled to range gate generator 57. Range gate generator 57 operates in response to pulses from P.R.F. generator 41 to produce five successively occurring range gates during each repetition interval of the pulses from the P.R.F. generator 41. These five successively occurring pulses appear sequentially on respective row selector lines $r_1$–$r_5$. The magnitude of the successively occurring range gates from range gate generator 57 is one-half the magnitude of a pulse required to change the magnetization state of a core in matrix 55. An individual magnetic core in matrix 55 will change from its first to its second magnetization state only upon the coincidence of pulses of one sense of polarity on its respective column selector and row selector lines, and will transfer back to its first magnetization state only upon the simultaneous energization of its respective selector lines in the opposite sense.

In order to read out the information stored in matrix 55, transfer pulses of a polarity opposite to the select pulses are supplied from read-out pulse generator 60 to each of the column selector lines $\theta_1$–$\theta_6$ and to each of the row selector lines $r_1$–$r_5$. Each core in matrix 55 whose respective $r$ and $\theta$ selector lines are energized during the read-in process changes its magnetization state and stores the information. The instantaneous application of transfer or read-out pulses from read-out pulse generator 60 to the respective $r$-$\theta$ lines will cause only a transferred core to return to its first magnetization state. A core which was not transferred during the read-in process will not be affected by the simultaneous application of transfer or read-out pulses to its $r$-$\theta$ windings during the read-out process. As will be described in more detail hereinbelow, the rise time of the transfer or read-out pulses is considerably shorter than the rise time of the selector read-in pulses.

Figure 2:
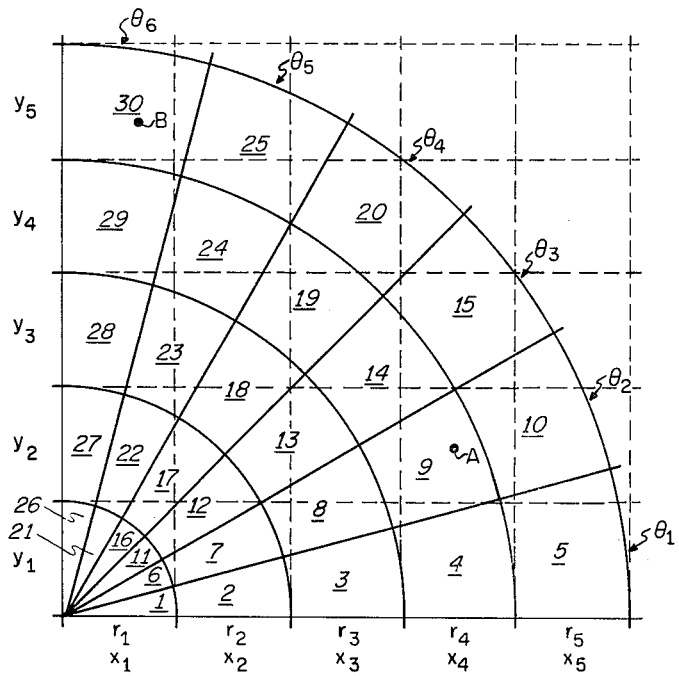
FIG. 2 is a chart showing the correspondence between polar and rectangular coordinates of a given area.

Each core of matrix 55 also is threaded by two respective lines of a rectangular coordinate system in a manner that can be understood best by referring to FIG. 2 which illustrates the 90° azimuth sector scanned by antenna 44. The 90° sector is subdivided into the six smaller azimuth sectors $\theta_1$–$\theta_6$ (the coordinates $\theta_1$–$\theta_6$ being a group of characters in the first information identification system), and each of these sectors is further divided into five range segments $r_1$–$r_5$ (the coordinates $r_1$–$r_5$ being another group of characters in said first information identification system), thus establishing a $r$-$\theta$ coordinate system for identifying areas in said 90° sector. The areas defined by the polar coordinate system are numbered 1 through 30. Each of the magnetic cores 1–30 in matrix 55 of FIG. 1 is associated with the correspondingly numbered area in the polar coordinate system of FIG. 2, so that when a target is detected in one of the areas identified by the polar coordinates, the apparatus of FIG. 1 will operate to change the magnetization state of the correspondingly numbered core in matrix 55. The 90° sector of scan in FIG. 2 also is subdivided according to an $x$-$y$ rectangular coordinate system so that any position in the 90° sector may be identified by both polar and rectangular coordinates. (The $x_1$–$x_5$ and $y_1$–$y_5$ coordinates correspond to two groups of characters in the second information identification system.)

To demonstrate the correspondence between the two coordinate systems, reference is made to FIG. 2 wherein it may be seen, by way of example, that the $x_3$ coordinate area of the rectangular coordinate system is associated with polar coordinate areas 3, 8, 13, 14, 19 and 20. Similarly, the $y_2$ abscissa area is associated with polar coordinate areas 27, 22, 17, 13, 9 and 10. Further examination of FIG. 2 will demonstrate that each polar area may be associated with an area identified by the rectangular coordinates. This correspondence between the two coordinate systems is accomplished in the core matrix 55 of FIG. 1 by threading an appropriate pair of $r$-$\theta$ lines and the corresponding $x$-$y$ lines through each core. Using the same example as above, it may be seen that the $x_3$ line in FIG. 1 threads cores numbered 3, 8, 13, 14, 19 and 20, while the $y_2$ line threads cores numbered 27, 22, 17, 13, 9 and 10.

In order to simplify the illustrations and description of the present invention, the respective polar and rectangular areas illustrated in FIG. 2 were chosen to be relatively large. As may be seen, this could result in some loss in resolution in the system. For example, a target in polar area 14 may lie in either of four of the rectangular coordinate areas which fall within polar area 14, depending upon the particular location of the target in said polar area. This resolution can be considerably improved by increasing the number of polar and rectangular areas within the 90° sector of FIG. 2. This is accomplished in practice by increasing the number of columns and rows of magnetic cores in matrix 55 of FIG. 1, and by a corresponding increase in the column and row selector and sensing windings and their associated energizing means. This demonstrates the suitability of a magnetic core matrix for use in the practice of this invention since matrices having large numbers of columns and rows are readily constructed.

In the operation of the system, assume that there are two remotely located objects A and B whose positions fall within the polar areas 9 and 30, respectively, of FIG. 2. The polar and rectangular coordinates of these objects are $r_4$-$\theta_2$, $x_4$-$y_2$ and $r_5$-$\theta_6$, $x_1$-$y_5$. The P.R.F. generator 41 modulates transmitter 42 whose high power pulses are coupled through duplexer 43 and are radiated from azimuth scanning antenna 44. Pulses from P.R.F. generator 41 also are coupled to range gate generator 57 which produces during each pulse interval successively occurring output pulses which sequentially energizes the row selector lines $r_1$-$r_5$. When antenna 44 is scanning angular sector $\theta_2$, pulses will be reflected from target A in polar area 9 and will be returned and detected by receiver 50. At this instant of time, azimuth commutator 51 connects receiver 50 to column selector line $\theta_2$ and the received pulse will energize said column selector line. Simultaneously, range gate generator 57 is energizing row selector line $r_4$ and the coincident energization of the $\theta_2$-$r_4$ selector lines causes magnetic core 9 to transfer from its first to its second remanent magnetization state. As antenna 44 continues its azimuth scan it will radiate pulses in azimuth sector $\theta_6$ and pulses will be reflected from object B in polar area 30. At this instant of time, receiver 50 is coupled by azimuth commutator 51 to column selector line $\theta_6$ and the return pulses from object B will cause column selector line $\theta_6$ to be energized. Simultaneously, range gate generator 57 is energizing row selector line $r_5$ and the coincident energization of $\theta_6$ and $r_5$ selector lines transfers magnetic core 30 from its first to its second remanent magnetization state. In this condition, matrix 55 is storing information identifying objects A and B in terms of their polar coordinates.

At the conclusion of the 90° sector scan by antenna 44 a "dead time" is provided for reading out the stored information in terms of its rectangular coordinates. This is accomplished by read-out pulse generator 60 which energizes the respective column selector lines $\theta_1$-$\theta_6$ and the respective row selector lines $r_1$-$r_5$. All of the selector lines may be energized simultaneously, or in a manner to scan the matrix by sequentially energizing the column selector lines and sequentially energizing the row selector lines during the interval that each column selector line is energized. The mode of operation during the read-out process may be determined by the manner in which the desired output signals are to be utilized. Assuming that all column selector and row selector lines are energized simultaneously by read-out pulse generator 60, all of said lines will be energized by pulses of a polarity opposite to those which transferred the cores from their first to their second magnetization states. The simultaneous energization of all column and row selector lines will cause only magnetic cores 9 and 30 to transfer from their second back to their first magnetization states since all remaining cores of matrix 55 already are in their first magnetization states. The retransfer of magnetic core 9 to its first magnetization state produces a flux therein which energizes rectangular coordinate sensing lines $x_4$-$y_2$ which thread said core 9. Similarly, the retransfer of magnetic core 30 back to its first magnetization state energizes rectangular coordinate sensing lines $x_1$-$y_5$ threaded therethrough. The signals on the energized sensing lines will be coupled to a storage or utilization device or a display device (not shown) to represent the position of detected objects A and B in terms of their individual rectangular coordinates.

In addition to the read-out method described above, various other methods may be utilized. For example, the read out may be carried out within the same period of time that information is being entered into the storage matrix. Under these conditions, undesired coupling between selector and sensing lines may occur. Interference of this type may be avoided by providing read-in or selector current pulses having leading-edge rise times approximately ten times the leading-edge rise times of the read-out or transfer current pulses. Since the induced voltages in the sensing lines depend upon the rate of change of flux, and the rate of change of flux is in turn dependent upon the slope of the current pulses, the slowly rising read-in pulses will induce negligible voltages in the sensing windings while the faster rising read-out pulses will cause a voltage to be induced in the sensing windings.

Matrix 55 of FIG. 1 could be operated, with suitable modifications, to transfer information in the opposite manner between the two information identification systems. That is, the input information received and stored in the matrix could be in terms of $x$-$y$ coordinate information, and the stored information could be read out on $r$-$\theta$ sensing lines.

The present invention represents an improvement over other known methods for transforming of information from one information utilization system (polar coordinates) to a second information identification system (rectangular coordinates) in that the magnetic core members and the coincident current operation thereof provide both the storage function and simplify the selection function since an external selection operation, such as a diode matrix for selecting the appropriate $r$-$\theta$ coordinates, is not required.

Figure 4:
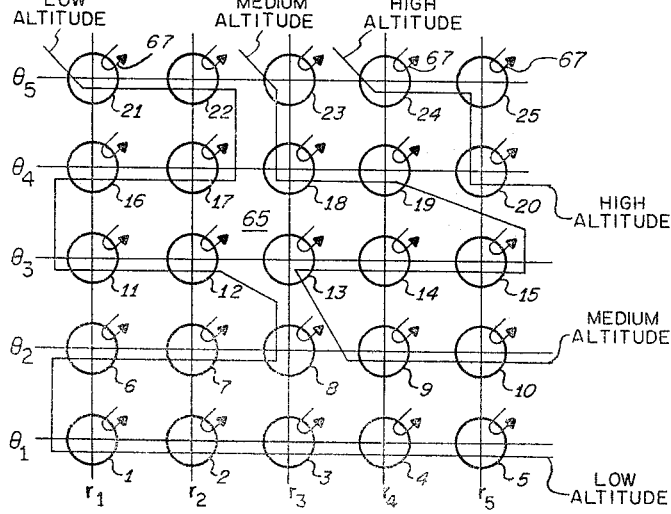
FIG. 4 is a wiring diagram of a magnetic core matrix and illustrates an alternative embodiment of the present invention.
Figure 3:
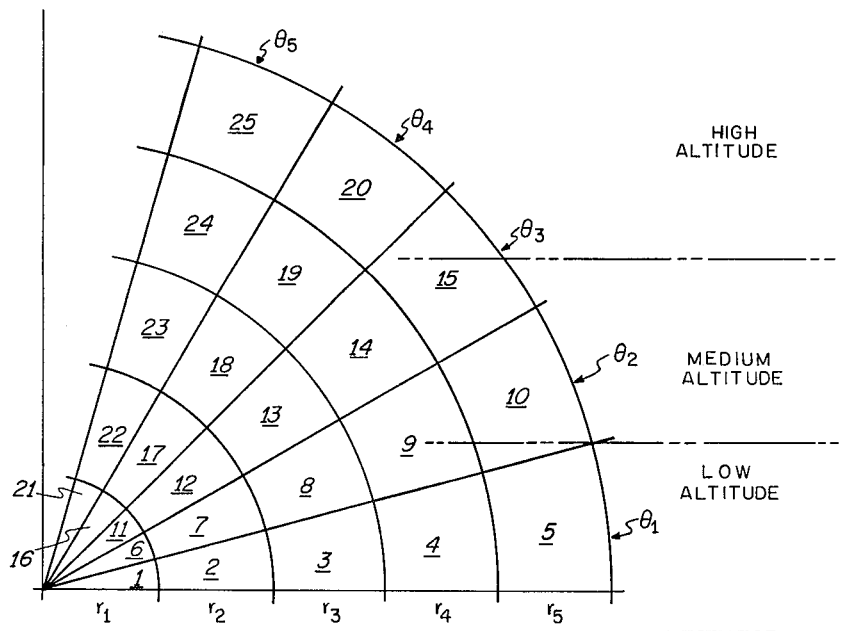
FIG. 3 is a chart showing a polar plot in an elevation plane where the polar areas are grouped according to their relative altitude.

Another embodiment of the present invention is illustrated in FIGS. 3 and 4, and as illustrated is adapted for use in converting the polar coordinate identification of a target into an identification system whose characters relate to the relative height of the target. This embodiment of the invention may be useful for assigning particular targets to different surveillance or tracking systems wherein the assignment is based on the altitude of the detected target.

FIG. 3 represents a polar plot in the elevation plane of a sector of space wherein the elevation plane is divided into polar areas 1–25 by the elevation sectors $\theta_1$-$\theta_5$ and range sectors $r_1$-$r_5$. The polar plot also is divided into three altitude regions as illustrated in FIG. 3. It may be seen that each of the polar areas 1–25 is associated with one of the altitude regions so that a target located in any of the areas 1–25 may be defined both by polar coordinates and by the altitude region in which it lies. The magnetic core matrix 65, FIG. 4, is comprised of 25 cores each of which is threaded by an r and an θ transfer line whose polar coordinate designations correspond to those of the similarly numbered polar area in FIG. 3. This correspondence between the polar areas and the altitude regions is reflected in the matrix of FIG. 4 by a high altitude sense winding which threads magnetic cores 20, 25 and 24. The correspondence between these two identification systems is further carried out in FIG. 4 by a low altitude sense winding which threads cores 1–8, 11, 12, 16, 17, 21 and 22. In a similar manner, a medium altitude sense winding threads those cores whose numbers correspond to the polar areas lying within the medium altitude region.

As illustrated in FIG. 4, matrix 65 is wired to operate in a somewhat different manner than the matrix 55 of FIG. 1. That is, each core of matrix 65 has an individual selector line 67 associated therewith for transferring its respective core from its first to its second magnetization state. These individual selector lines 67 may be coupled to external apparatus of a type known to those skilled in the art wherein the $r$-$θ$ selection of magnetic core members is accomplished.

Assuming that certain of the cores in matrix 65 have been transferred to their second magnetization states by the energization of their respective selector lines 67 and thus are storing target information in terms of their $r$-$θ$ coordinates (the characters in a first information identification system), this information may be read out and converted to height information (the characters in a second information identification system) by sequentially energizing row transfer lines $θ_1$–$θ_5$ and successively energizing column transfer lines $r_1$–$r_5$ during the interval that each row transfer line is energized. Upon the concurrent energization of the column and row transfer lines threading a core in matrix 65, that core will transfer back to its first magnetization state and will energize the altitude sensing winding threaded therethrough, thus converting the polar coordinate designation of a target to a designation which identifies an object in terms of its relative height.

The mode of operation just described is adaptable for use in a system wherein the input information occurs in random fashion while the output information is to occur in an ordered sequence. That is, the magnetic cores of matrix 65 may be transferred to their second magnetization state in a random fashion by the individual selector lines 67, and may be retransferred back to their first magnetization state by an orderly sequence of energization of the $r$-$θ$ transfer lines. This would occur, for instance, in a Doppler radar system where target information must be integrated in individual Doppler filters having time constants of many range intervals and whose outputs are therefore random with respect to master trigger time.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for transforming the designation of information from a first information identification system to a second information identification system comprising, a plurality of magnetic core members having two remanent magnetization states, a plurality of selector lines each threading only a respective magnetic core member of said matrix, means for individually energizing said selector lines with pulse signals representing information expressed in said first information identification system, each one of said pulse signals being of sufficient magnitude to transfer a magnetic core member from its first to its second remanent magnetization state, a plurality of transfer lines each corresponding to designated information expressed in terms of said first information identification system, each core of said matrix having a plurality of said transfer lines threaded therethrough, a plurality of sensing lines each corresponding to designated information expressed in said second information identification system, each sensing line threading a respective selected number of cores in said matrix, where said number may be any integer other than zero, the cores threaded by the sensing lines being selected in accordance with the correspondence between said two identification systems for identifying the same information, means for energizing said transfer lines in a given ordered sequence to transfer back to the first remanent magnetization state those cores which are in their second remanent magnetization state, the transfer of cores from their second remanent magnetization state to their first remanent magnetization state energizing the respective sensing windings threaded therethrough to produce output signals in said ordered sequence representing information expressed in said second information identification system.

2. The combination claimed in claim 1 wherein said transfer lines comprise a plurality of sets of lines and each of said sets of lines correspond to a group of characters in said first information identification system, each core of said matrix having one line from each of the sets threaded therethrough.

References Cited by the Examiner
UNITED STATES PATENTS 2,890,441   6/59   Duinker _____ 340—174
2,997,705   8/61   Freedman _____ 340—347

NEIL C. READ, *Primary Examiner.*

MALCOLM MORRISON, *Examiner.*